F. E. F. NEUBERT.
TWINE CUTTER.
APPLICATION FILED APR. 18, 1913.
1,085,289.
Patented Jan. 27, 1914.
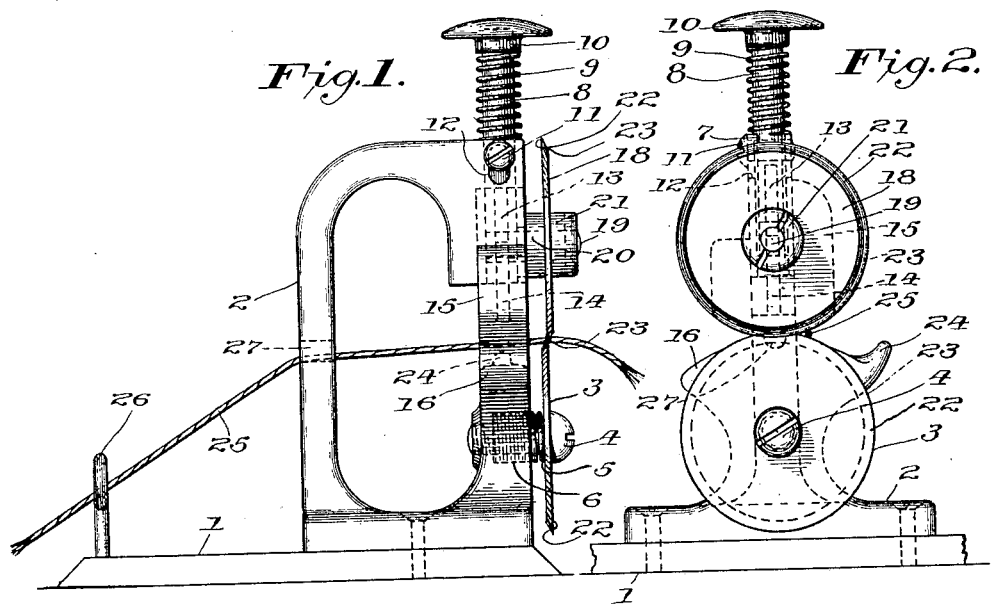
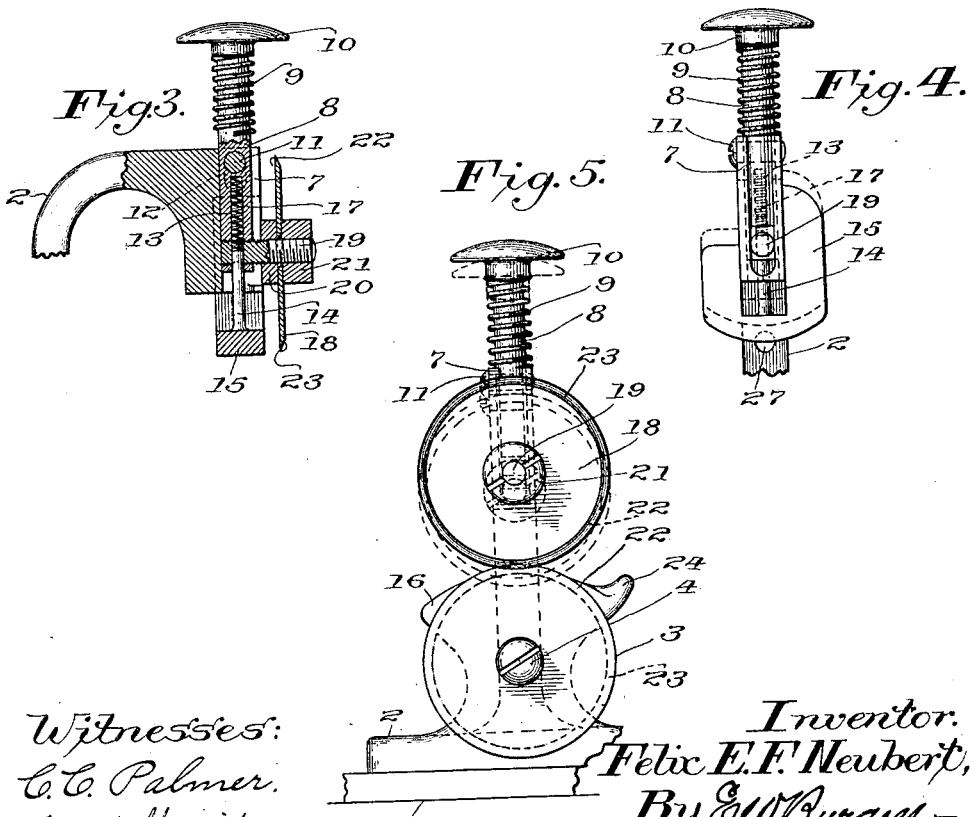
Witnesses:
C. C. Palmer.
F. W. Hoffmeister.
Inventor.
Felix E. F. Neubert,
By E. W. Burgess
Atty.

UNITED STATES PATENT OFFICE.

FELIX E. F. NEUBERT, OF CHICAGO, ILLINOIS.

TWINE-CUTTER.

1,085,289.	Specification of Letters Patent.	Patented Jan. 27, 1914.

Application filed April 18, 1913. Serial No. 761,913.

*To all whom it may concern:*

Be it known that I, FELIX E. F. NEUBERT, a citizen of the United States, residing at Chicago, in the county of Cook and State of Illinois, have invented certain new and useful Improvements in Twine-Cutters, of which the following is a specification.

The invention relates to twine cutters designed to be used in connection with the wrapping and securing of parcels, and the object thereof is to provide a twine cutter that is simple and cheap in its structure, and efficient in operation. These objects are attained by means of the mechanism illustrated by the accompanying drawings, in which—

Figure 1 represents a side elevation of the mechanism; Fig. 2 is a front elevation of Fig. 1; Fig. 3 is a partial sectional side elevation of Fig. 1; Fig. 4 is a partial sectional elevation of Fig. 2; and Fig. 5 is a front elevation of Fig. 1 designed to show how pressure may be applied to render the device operative under extreme conditions.

The same reference numerals designate the same parts throughout the several views.

1 represents a base member upon which the mechanism comprising my invention is mounted. The mechanism includes a C-shaped frame member 2, having a lower disk cutter 3 rotatably mounted upon a threaded stud 4 received by the frame member and yieldingly held against lateral displacement by means of a coiled spring 5 encircling the stud and received by a counterbore 6 in the frame member and pressing against the disk cutter 3. The C-shaped frame member at the upper part thereof is provided with a vertically arranged slotted portion 7 that is provided with a circular enlargement at the rear thereof that receives a cylindrical plunger 8, having a compression spring 9 surrounding the upper end thereof and operative between the upper end of the C-shaped frame member and a head member 10 to yieldingly hold the plunger in a raised position, and 11 represents a laterally projecting screw threaded stud carried by the plunger and received by a slot 12 in the frame member and operative to limit a longitudinal movement of the plunger 8. The plunger 8 is provided with an axial bore 13 that slidably receives a vertically arranged dowel member 14 carried by a twine guiding member 15 that is slidably mounted upon the upper end of the C-frame member 2 and yieldingly pressed toward a lower twine guide 16 by means of a compression spring 17 received by the axial bore in the plunger 8 and operative against the upper end of the dowel member 14. The twine guiding member 15 is made substantially concentric with the axis of an upper disk cutter 18 that is rotatably mounted upon a stud 19 carried by the lower end of the plunger 8; the stud being threaded in a manner to receive a spacing screw threaded washer 20 operative to adjust the upper twine disk cutter 18 in proper operative relation with the lower twine disk cutter 3, and 21 represents a securing nut at the opposite side of the cutting disk and operative to hold the adjusted parts in operative relation.

The twine cutting disks 3 and 18 are provided with opposing overlapping peripheral portions 22, upon the contacting faces thereof, and with beveled peripheral cutting edges 23 upon the opposite sides thereof. The lower twine guiding member 16 is curved oppositely to the guide 15, and is provided with an upwardly turned horn portion 24 for the purpose of preventing accidental displacement of the twine as it is being brought into engagement with the cutting disks.

In operation the twine 25 is led from any suitable receptacle through proper guides, as an eye member 26 and an opening 27 through the rear side of the C-shaped frame member 2, and across the guide member 16, and is severed by drawing it against the opposing disk cutters, the upper twine guiding member yielding upward to accommodate the larger sizes of wrapping twine, and pressure may be applied to the plunger 8 when the cutting is abnormally difficult.

What I claim as being my invention, and desire to secure by Letters Patent, is:

1. A twine severing mechanism including, in combination, a C-shaped frame member, a twine severing disk rotatably mounted upon a horizontal axis upon the lower portion of said frame member, a fixed twine guide adjacent said disk and forming part of said frame member, an opposing twine severing disk rotatably mounted upon a horizontal axis upon the upper portion of said frame member, and a vertically movable opposing twine guide carried by the upper part of said frame member.

2. A twine severing mechanism including, in combination, a C-shaped frame member, a horizontally arranged stud secured to the lower part of said frame member, a rotatable twine severing disk mounted upon said stud, a compression spring encircling said stud and operative between said frame member and said disk, an opposing twine severing disk rotatably mounted upon the upper part of said frame member and adapted to move vertically relative thereto.

3. A twine severing mechanism including, in combination, a C-shaped frame member, a horizontally arranged stud secured to the lower part of said frame member, a rotatable twine severing disk mounted upon said stud, a compression spring encircling said stud and operative between said frame member and said disk, an opposing twine severing disk rotatably mounted upon the upper part of said frame member and adapted to move vertically relative thereto, and opposing fixed and movable twine guides coöperating with said twine severing disks.

4. A twine severing mechanism including, in combination, a C-shaped frame member, a rotatable vertically arranged twine severing disk mounted upon the lower part of said frame member, a vertically slidable plunger carried by the upper part of said frame member, a horizontally arranged stud carried by said plunger, a twine severing disk rotatably mounted upon said stud, said plunger being yieldingly controlled in a manner to permit the upper disk to be moved vertically relative to said lower disk.

5. A twine severing mechanism including, in combination, a C-shaped frame member, a rotatable vertically arranged twine severing disk mounted upon the lower part of said frame member, a twine guide adjacent said disk, a vertically slidable plunger carried by the upper part of said frame member, an opposing twine severing disk carried by said plunger, said plunger having an axial bore, a twine guide slidably mounted upon the upper part of said frame member and provided with a vertically arranged dowel that is slidably received by the axial bore in said plunger, and a compression spring within the axial bore and operative to yieldingly hold the upper twine guide in operative relation with said lower twine guide.

FELIX E. F. NEUBERT.

Witnesses:
W. F. MEMMLER,
B. F. MORAN.

---

Copies of this patent may be obtained for five cents each, by addressing the "Commissioner of Patents, Washington, D. C."